(12) United States Patent
Tang et al.

(10) Patent No.: US 9,241,006 B2
(45) Date of Patent: Jan. 19, 2016

(54) METHOD AND SYSTEM FOR DETECTING WEBSITE VISIT ATTEMPTS BY BROWSERS

(71) Applicant: Tencent Technology (Shenzhen) Company Limited, Shenzhen (CN)

(72) Inventors: Wen Liang Tang, Shenzhen (CN); Xiao Dong Ou, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 14/142,491

(22) Filed: Dec. 27, 2013

(65) Prior Publication Data

US 2014/0115700 A1  Apr. 24, 2014

Related U.S. Application Data

(63) Continuation of application No. PCT/CN2013/085736, filed on Oct. 23, 2013.

(30) Foreign Application Priority Data

Oct. 24, 2012  (CN) .......................... 2012 1 0410486

(51) Int. Cl.
  *H04L 29/06* (2006.01)
  *H04L 29/08* (2006.01)

(52) U.S. Cl.
  CPC ............ *H04L 63/1425* (2013.01); *H04L 67/22* (2013.01)

(58) Field of Classification Search
  CPC ...... H04L 63/1425; H04L 29/06; H04L 67/22
  See application file for complete search history.

(56) References Cited

U.S. PATENT DOCUMENTS 7,631,007 B2 * 12/2009 Morris ................ G06Q 10/063 705/7.11
2003/0014659 A1 * 1/2003 Zhu .................... G06F 17/30867 726/13

(Continued)

FOREIGN PATENT DOCUMENTS

| CN | 1859398 | 11/2006 |
|----|---------|---------|
| CN | 1949715 | 4/2007 |
| CN | 102402620 | 4/2012 |

OTHER PUBLICATIONS

Ahmed et al., An Automated User Transparent Approach to log Web URLs for Forensic Analysis, Sep. 2009, Fifth International Conference on IT Security Incident Management and IT Forensics, pp. 120-127.*

(Continued)

*Primary Examiner* — Kenneth Chang
(74) *Attorney, Agent, or Firm* — Morrison & Foerster LLP

(57) ABSTRACT

A method and system of detecting website visit attempts by browsers includes monitoring networking operations generated by a client and intercepting a network address associated with the networking operations, detecting a type of website from the intercepted network address, and determining that a browser on the client has attempted to visit a website of the detected type based on the browser being in a running state and a website identified as historically visited by the browser matching the detected type of website. This can allow for the accurate detection of a browser's attempt to visit a restricted website, thereby accomplishing accurate monitoring of networking activities of the browser and enhancing the accuracy of subsequent prompting or intercepting of the networking activities of the browser.

9 Claims, 4 Drawing Sheets

(56) References Cited

U.S. PATENT DOCUMENTS

| | | | |
|---|---|---|---|
| 2003/0083938 A1* | 5/2003 | Smith et al. | 705/14 |
| 2003/0163731 A1* | 8/2003 | Wigley et al. | 713/201 |
| 2004/0249938 A1* | 12/2004 | Bunch | 709/224 |
| 2005/0060535 A1* | 3/2005 | Bartas | H04L 63/145 713/154 |
| 2007/0039038 A1* | 2/2007 | Goodman et al. | 726/2 |
| 2013/0198512 A1* | 8/2013 | Rubin et al. | 713/157 |

OTHER PUBLICATIONS

International Search Report and Written Opinion mailed Jan. 30, 2014, directed to International Application No. PCT/CN2013/085736; 11 pages.

* cited by examiner

METHOD AND SYSTEM FOR DETECTING WEBSITE VISIT ATTEMPTS BY BROWSERS

CROSS REFERENCE TO RELATED APPLICATION

This application is a U.S. continuation application under 35 U.S.C. §111(a) claiming priority, under 35 U.S.C. §120 and 365(c), to International Application No. PCT/CN2013/085736 filed on Oct. 23, 2013, which claims the priority benefit of Chinese Patent Application No. 201210410486.7, filed on Oct. 24, 2012, the contents of both the PCT application and the Chinese application are incorporated by reference herein in their entirety for all purposes.

FIELD OF THE DISCLOSURE

This relates to network monitoring technology, including a method and system for detecting website visit attempts by browsers.

BACKGROUND

A client computing device (hereinafter "client" or "client system") can run multiple types of networking software, such as networking software run in the foreground of the client (e.g., application level software visible to a user) and networking software run in the background of the client (e.g., operating system level that is not visible to the user). When a client accesses the Internet, a browser running on the client is usually the complex software that generates frequent networking activities at the client. The security of the client system, therefore, can largely depend on monitoring of the networking activities of the browser.

Traditional technology that monitors client networking operations performs prompting or intercepting when an attempt of a connection to a restricted website is detected in the course of software monitoring. However, when monitoring the networking activities of a third party application, the monitoring party does not know which software application triggers the attempted connection to a restricted website. Rather, only the attempt by the client to visit a restricted website is detected. Without accurate monitoring of networking activities of a browser, if a browser attempts to visit a restricted website, traditional technology that monitors the client networking operations cannot detect that it is the browser that attempts to visit a restricted website, and therefore cannot perform accurate prompting or intercepting of the networking activities of the browser.

SUMMARY

A method and system is provided for detecting website visit attempts by browsers, which can allow the networking activities of the browsers to be accurately monitored.

For example, security software can detect website visit attempts by a client browser by monitoring networking operations generated by a client and intercepting a network address (e.g., a uniform resource locator or URL) associated with the networking operations, detecting a type of website (e.g., a restricted website) from the intercepted network address, and determining that the browser on the client has attempted to visit a website of the detected type based on the browser being in a running state and a website identified as historically visited by the browser matching the detected type of website.

In particular, when there is an attempted connection between the client and a restricted website, the security software can detect the historical records of the browser as well as the browser's status (e.g., running or not running) in order to determine whether the browser is the application that has attempted to visit the restricted website.

In this manner a browser's attempt to visit a restricted website can be accurately detected and prevented, thereby providing accurate monitoring of networking activities of the browser and enhancing the accuracy of subsequent prompting or intercepting of the networking activities of the browser.

DETAILED DESCRIPTION

The present disclosure is directed to preventing access to restricted websites from a client browser. Although the embodiments disclosed herein describe preventing client browsers from accessing restricted websites, the disclosure is not so limited and can be used to prevent any type of application having a network request history from accessing any restricted network site.

Figure 1:
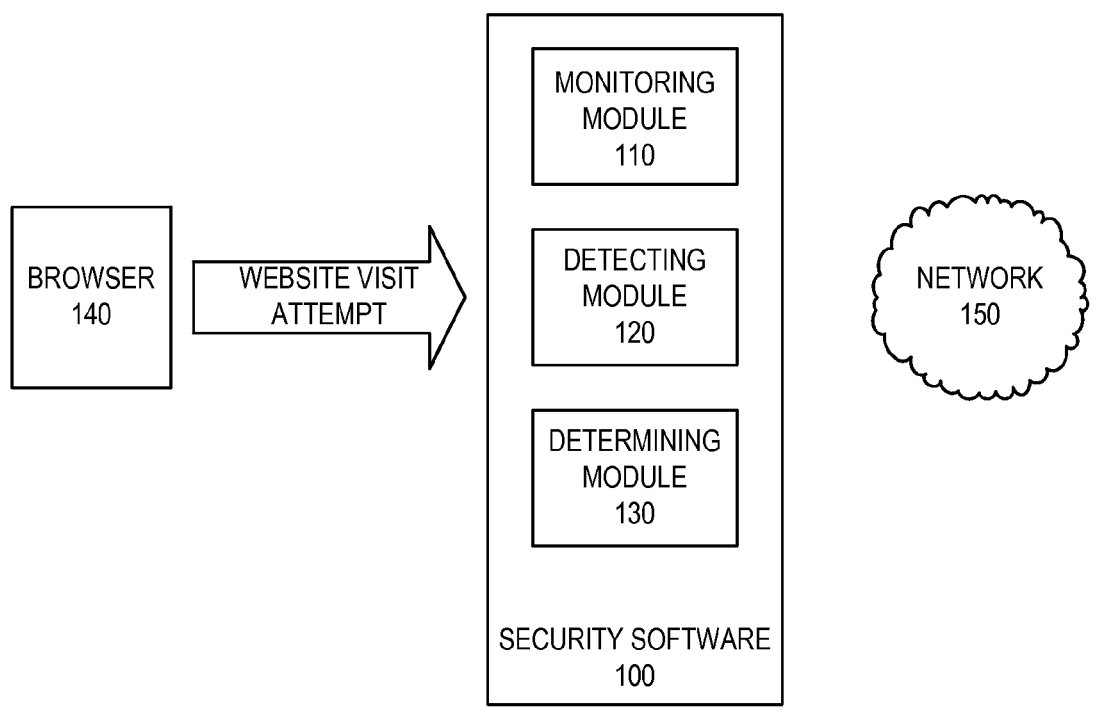
FIG. 1 illustrates an example of security software detecting a website visit attempt by a browser.

FIG. 1 illustrates an example of security software detecting a website visit attempt by a browser. In the illustrated embodiment, security software 100 sits between browser 140, such as a web browser, and network 150, such as the Internet, so that security software 100 can analyze attempts to access a website on network 150 before the website is actually accessed and to determine if those attempts are coming from browser 140.

Security software 100 comprises monitoring module 110, detecting module 120 and determining module 130. It is noted that the modules need not be distinct and that the functionality provided therein may arranged in any suitable programming construct.

Figure 2:
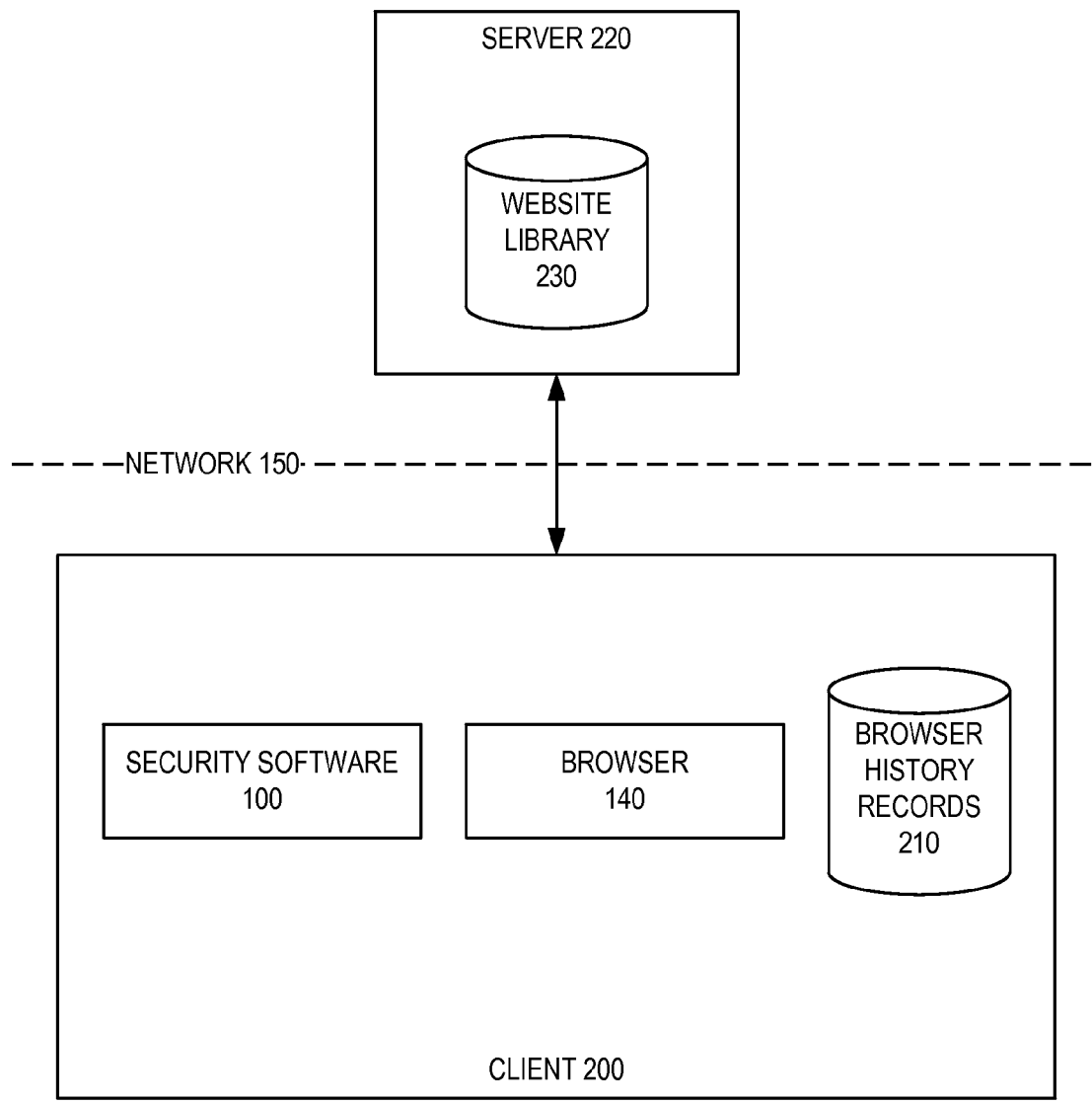
FIG. 2 illustrates an example of a system architecture for detecting website visit attempts by browsers.

FIG. 2 illustrates an example of a system architecture for detecting website visit attempts by browsers. In the illustrated embodiment, client 200 comprises a computing device on which security software 100, browser 140 and browser history records 210 are stored. Browser history records 210 can comprise a list of websites that browser 140 has attempted to visit. Client 200 can communicate over network 150 with server 220 which can store website library 230. Website library 230 can comprise a list of websites of suitable types, such as restricted websites. Although not shown, components of security software 100 can reside on both client 200 and server 220 in some embodiments.

Figure 3:
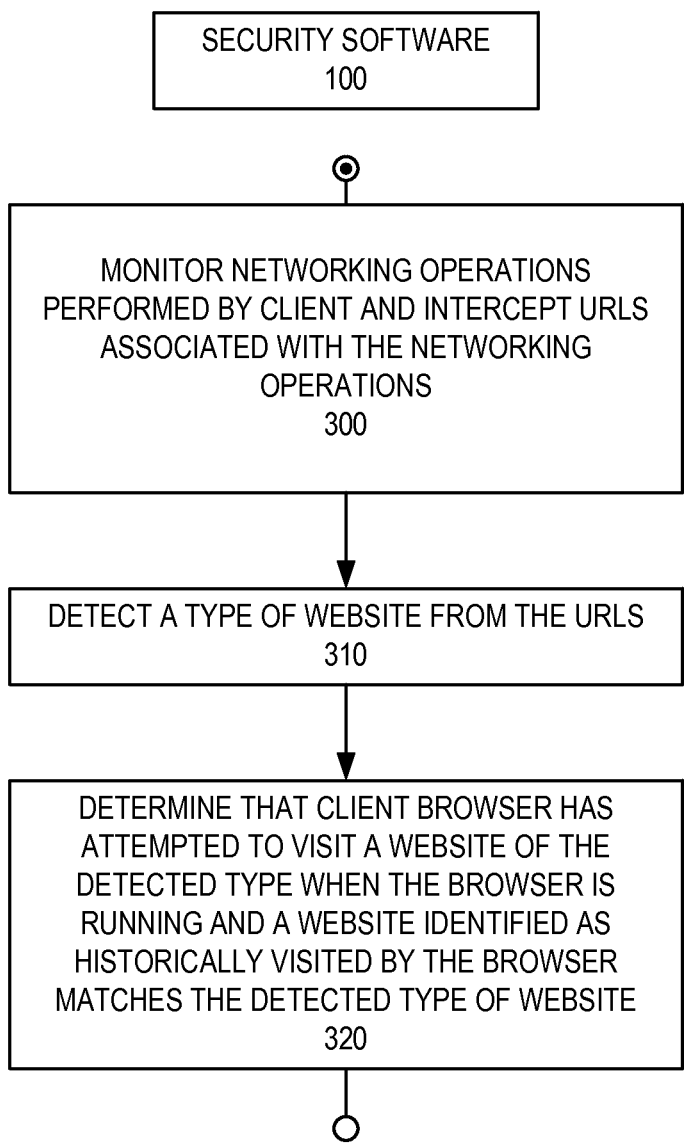
FIG. 3 illustrates an example of a process for detecting website visit attempts by browsers.

FIG. 3 illustrates an example of a process for detecting website visit attempts by browsers. In the illustrated embodiment, security software 100 (e.g., via monitoring module 110) can monitor networking operations generated by client 200 and intercept URLs associated with the networking operations (block 300).

This can comprise real-time monitoring of networking operations generated by security software 100 at a bottom layer of the operating system of client 200 (e.g., the layer which manages input/output such as networking), such as the network firewall loaded into the bottom layer of the client operating system. For example, for the Android systems installed in mobile phones, laptops and other wireless clients, monitoring networking activities by all software of a local client can be achieved by the Ip Table component loaded into the bottom layer of Android system. This can also comprise intercepting URLs requested in the networking operations when one or more network addresses are detected by the software.

Security software 100 (e.g., via detecting module 120) can also detect a type of website using a database (e.g., a URL database such as website library 230) of a remote or backend server (server 220). This can comprise first transmitting to the server the website addresses intercepted and then matching at the server the website addresses received with the web addresses of a particular type (e.g., for restricted sites) that are stored at the server. If successful, security software 100 can determine that the websites addresses in question are of the stored type and return the determination results to the client.

In particular, this can involve intercepting all or part of the domain names of the web addresses visited and transmitting such to the server for the server to match with the same addresses in the website library and to inquire whether the domain names are of the type to be detected. Of the type to be detected website library 230 records the various URLs and their attributes. For example, suppose one wants to detect malware such as fraud deduction, false fishing, pornographic websites, Trojan viruses, etc. Presume that a web address such as www.ppp333.com is transmitted to the server and that web address www.ppp333.com has been included in the web library of the server and registered as a pornographic website. The successful match of the address means the website is a malicious porn site and the result is returned to the client. The matching and detecting of the stored type of website can also be implemented in other suitable ways, such as using a local database.

Security software 100 (e.g., via determining module 130) can subsequently determine that a browser has visited a website of the stored type when the browser on the client is running and a website identified as historically visited by the browser matches the first type of website (block 320). This can comprise, after determining that a client has attempted to visit a website of the stored type, further determining whether the browser has attempted to visit websites of the stored type based on the historical records of the browser as well as the status of running.

In particular, security software 100 can first read the history of website visits from the history records of the client browser (browser history records 210). Then security software 100 can determine whether the website identified as historically visited is the same as the website of the stored type. If yes, security software 100 can further determine the running status of the browser; if the browser is running, security software 100 can determine that the browser has attempted to visit the website of the stored type. The program interface function of the operating system can be deployed to determine the running status of the browser, such as deploying the API of the Android system to inquire as to which programs are currently running so as to obtain the running status of the browser of the Android system.

After it has been determined that the browser has visited the website of the stored type, security software 100 can display information relating to the visiting of the website of the stored type by the browser. By displaying related information, a direct prompt can be presented to the user to guide the user to perform another operation. For example, when it has been detected that the browser is visiting a malicious website, accurate prompting/intercepting can be performed by security software 100 against the networking activity of the browser, or security software 100 can prompt the user to intercept the website visit attempt and hence to safeguard the security of the client system.

Figure 4:
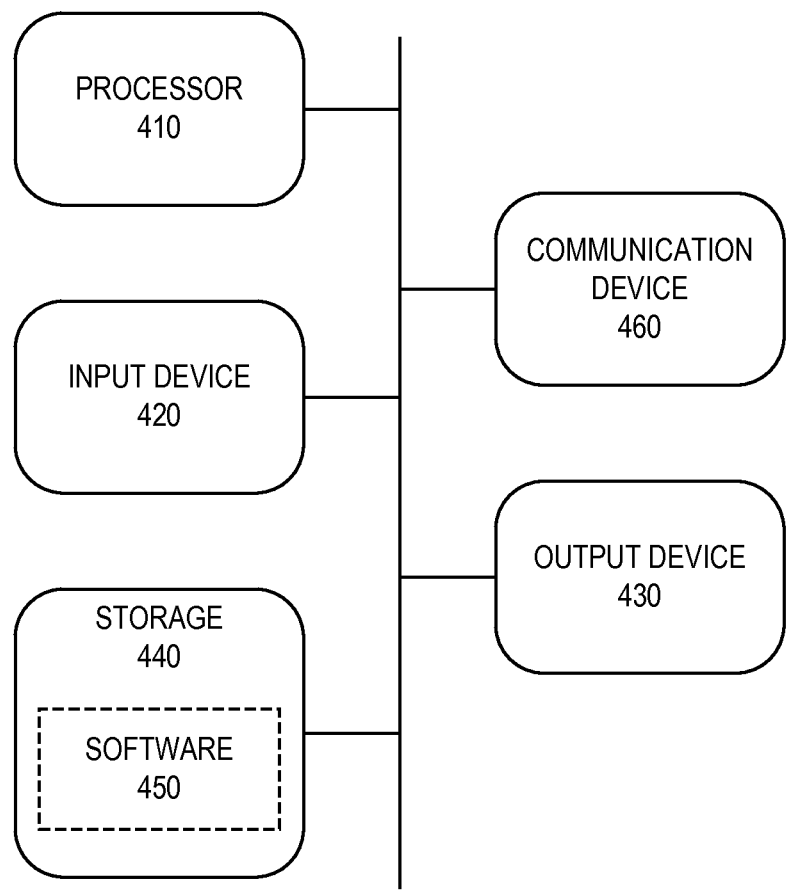
FIG. 4 illustrates an example of a computing device.

FIG. 4 shows a block diagram of an example of a computing device, which may generally correspond to client 200 and server 230. The form of computing device 400 may be widely varied. For example, computing device 400 can be a personal computer, workstation, server computing device, portable computing device, or any other suitable type of microprocessor-based device. Computing device 400 can include, for example, one or more components including processor 410, input device 420, output device 430, storage 440, and communication device 460. These components may be widely varied, and can be connected to each other in any suitable manner, such as via a physical bus, network line or wirelessly for example.

For example, input device 420 may include a keyboard, mouse, touch screen or monitor, voice-recognition device, or any other suitable device that provides input. Output device 430 may include, for example, a monitor, printer, disk drive, speakers, or any other suitable device that provides output.

Storage 440 may include volatile and/or nonvolatile data storage, such as one or more electrical, magnetic or optical memories such as a RAM, cache, hard drive, CD-ROM drive, tape drive or removable storage disk for example. Communication device 460 may include, for example, a network interface card, modem or any other suitable device capable of transmitting and receiving signals over a network.

Network 150 may include any suitable interconnected communication system, such as a local area network (LAN) or wide area network (WAN) for example. Network 150 may implement any suitable communications protocol and may be secured by any suitable security protocol. The corresponding network links may include, for example, telephone lines, DSL, cable networks, T1 or T3 lines, wireless network connections, or any other suitable arrangement that implements the transmission and reception of network signals.

Software 450 can be stored in storage 440 and executed by processor 410, and may include, for example, programming that embodies the functionality described in the various embodiments of the present disclosure. The programming may take any suitable form. Software 450 may include, for example, the security application components of client 200 and server 230 described above.

Software 450 can also be stored and/or transported within any computer-readable storage medium for use by or in connection with an instruction execution system, apparatus, or device, such as computing device 400 for example, that can fetch instructions associated with the software from the instruction execution system, apparatus, or device and execute the instructions. In the context of this document, a computer-readable storage medium can be any medium, such as storage 440 for example, that can contain or store programming for use by or in connection with an instruction execution system, apparatus, or device.

Software 450 can also be propagated within any transport medium for use by or in connection with an instruction execution system, apparatus, or device, such as computing device 400 for example, that can fetch instructions associated with the software from the instruction execution system, apparatus, or device and execute the instructions. In the context of this document, a transport medium can be any medium that can communicate, propagate or transport programming for use by or in connection with an instruction execution system, apparatus, or device. The transport readable medium can include, but is not limited to, an electronic, magnetic, optical, electromagnetic or infrared wired or wireless propagation medium.

It will be appreciated that the above description for clarity has described embodiments of the disclosure with reference to different functional units and processors. However, it will be apparent that any suitable distribution of functionality between different functional units or processors may be used without detracting from the disclosure. For example, functionality illustrated to be performed by separate systems may be performed by the same system, and functionality illustrated to be performed by the same system may be performed by separate systems. Hence, references to specific functional units may be seen as references to suitable means for providing the described functionality rather than indicative of a strict logical or physical structure or organization.

The disclosure may be implemented in any suitable form, including hardware, software, firmware, or any combination of these. The disclosure may optionally be implemented partly as computer software running on one or more processors. The elements and components of an embodiment of the disclosure may be physically, functionally, and logically implemented in any suitable way. Indeed, the functionality may be implemented in a single unit, in multiple units, or as part of other functional units. As such, the disclosure may be implemented in a single unit or may be physically and functionally distributed between different units and processors.

One skilled in the relevant art will recognize that many possible modifications and combinations of the disclosed embodiments can be used, while still employing the same basic underlying mechanisms and methodologies. The foregoing description, for purposes of explanation, has been written with references to specific embodiments. However, the illustrative discussions above are not intended to be exhaustive or to limit the disclosure to the precise forms disclosed. Many modifications and variations can be possible in view of the above teachings. The embodiments were chosen and described to explain the principles of the disclosure and their practical applications, and to enable others skilled in the art to best utilize the disclosure and various embodiments with various modifications as suited to the particular use contemplated.

Further, while this specification contains many specifics, these should not be construed as limitations on the scope of what is being claimed or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A method comprising:
monitoring networking operations generated by a client and intercepting a network address associated with the networking operations;
detecting a type of website from the intercepted network address;
determining that a browser on the client has attempted to visit a website of the detected type; and
displaying information relating to the attempt to visit the website of the detected type by the browser,
wherein the determining comprises:
reading a history of website visits from history records of the browser,
determining from the history that a website historically visited by the browser is the same as the website of the detected type,
determining that a running status of the browser is running; and
wherein the monitoring and intercepting comprises real-time monitoring of website visiting activities by software of the client at a bottom layer of an operating system of the client; and
intercepting a network address requested in the networking operations when a network address is detected by the software to safeguard security of the client.

2. The method of claim 1, wherein the detecting comprises transmitting the intercepted network address to a server;
matching at the server the intercepted address with network addresses of a type stored at the server; and
returning results of the matching to the client.

3. The method of claim 1, wherein the network address comprises a uniform resource locator.

4. The method of claim 1, wherein the type of website comprises a restricted website.

5. A method comprising:
monitoring networking operations generated by a client and intercepting a network address associated with the networking operations;
detecting a type of network site from the intercepted network address;
determining that an application on the client has attempted to visit a network site of the detected type; and
displaying information relating to the attempt to visit the network site of the detected type by the application,
wherein the determining comprises:
reading a history of network site visits from history records of the application,
determining from the history that a network site historically visited by the application is the same as the network site of the detected type,
determining that a running status of the application is running; and
wherein the monitoring and intercepting comprises real-time monitoring of network site visiting activities by software of the client at a bottom layer of an operating system of the client; and
intercepting a network address requested in the networking operations when a network address is detected by the software to safeguard security of the client.

6. A non-transitory computer readable medium storing a program causing a computer to execute a method, the method comprising:
monitoring networking operations generated by a client and intercepting a network address associated with the networking operations;
detecting a type of website from the intercepted network address;
determining that a browser on the client has attempted to visit a website of the detected type; and
displaying information relating to the attempt to visit the website of the detected type by the browser,
wherein the determining comprises:
reading a history of website visits from history records of the browser, determining from the history that a website historically visited by the browser is the same as the website of the detected type, and determining that a running status of the browser is running; and wherein the monitoring and intercepting comprises real-time monitoring of website visiting activities by software of the client at a bottom layer of an operating system of the client; and intercepting a network address requested in the networking operations when a network address is detected by the software to safeguard security of the client.

7. The computer readable medium of claim 6, wherein the detecting comprises transmitting the intercepted network address to a server;

matching at the server the intercepted address with network addresses of a type stored at the server; and returning results of the matching to the client.

8. The computer readable medium of claim 6, wherein the network address comprises a uniform resource locator.

9. The computer readable medium of claim 6, wherein the type of website comprises a restricted website.

* * * * *